United States Patent [19]

Sharon

[11] Patent Number: 5,707,168

[45] Date of Patent: Jan. 13, 1998

[54] HEAVY OBJECT LIFTING CONNECTOR DEVICE

[75] Inventor: Aharon E. Sharon, Houston, Tex.

[73] Assignee: Houston Industries, Inc., Houston, Tex.

[21] Appl. No.: 698,563

[22] Filed: Aug. 15, 1996

[51] Int. Cl.[6] .................................................. F16B 17/00
[52] U.S. Cl. ........................ 403/362; 403/335; 294/67.2
[58] Field of Search ........................... 403/3, 4, 335, 403/337, 362; 285/38; 294/67.2, 67.21, 67.22, 15, 92

[56] References Cited

U.S. PATENT DOCUMENTS

| Re. 32,532 | 10/1987 | Sonerud. | |
|---|---|---|---|
| 597,438 | 1/1898 | Schilling | 294/67.21 |
| 814,388 | 3/1906 | Moore | 294/92 |
| 1,857,091 | 5/1932 | Von der Horst. | |
| 2,338,998 | 1/1944 | Cassens et al. | 294/67.21 X |
| 2,542,289 | 2/1951 | Robbins. | |
| 2,693,386 | 11/1954 | Renfroe | 294/92 |
| 2,801,128 | 7/1957 | Washabaugh | 294/67.2 |
| 2,984,513 | 5/1961 | Nearman | 294/67.22 |
| 2,987,339 | 6/1961 | Kaplan et al. | 294/67.2 X |
| 3,122,354 | 2/1964 | Rodeback | 294/92 X |
| 3,144,088 | 8/1964 | Kaplan | 294/67.2 X |
| 3,517,959 | 6/1970 | Ferguson. | |
| 3,789,562 | 2/1974 | De Chicchis et al. | 403/3 X |
| 4,427,228 | 1/1984 | Mattila. | |
| 4,515,522 | 5/1985 | Sonerud. | |
| 4,826,388 | 5/1989 | Golding. | |
| 5,382,131 | 1/1995 | Werthmann. | |

FOREIGN PATENT DOCUMENTS

| 0112818 | 1/1969 | Denmark | 294/67.2 |
|---|---|---|---|
| 1457942 | 12/1965 | France | 294/67.21 |

*Primary Examiner*—Anthony Knight
*Assistant Examiner*—William L. Miller
*Attorney, Agent, or Firm*—Pravel, Hewitt, Kimball & Krieger

[57] ABSTRACT

A heavy lifting tool connector device is provided for lifting objects containing an outer peripheral surface and a plurality of holes. The connector device includes one or more connector rods having a fixed end and a free end and a lifting bolt having a hoist end and a contact end.

12 Claims, 1 Drawing Sheet

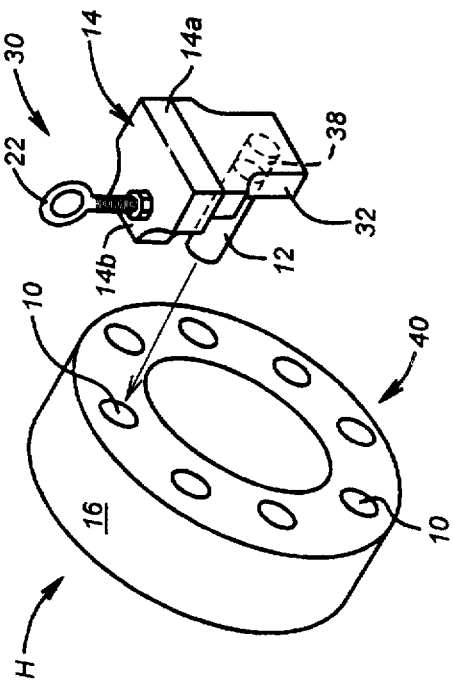
FIG. 4
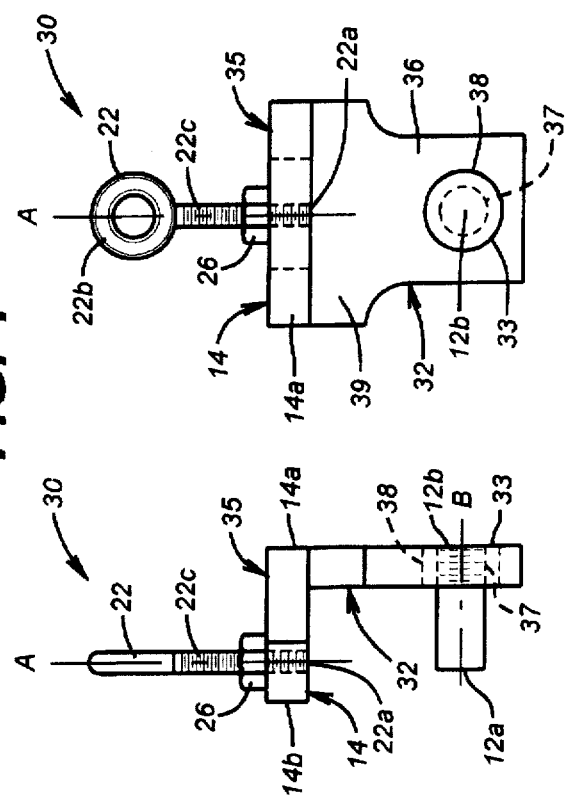
FIG. 6
FIG. 5
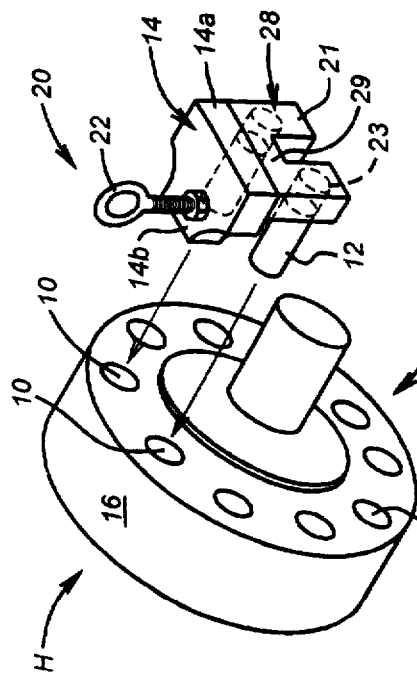
FIG. 1
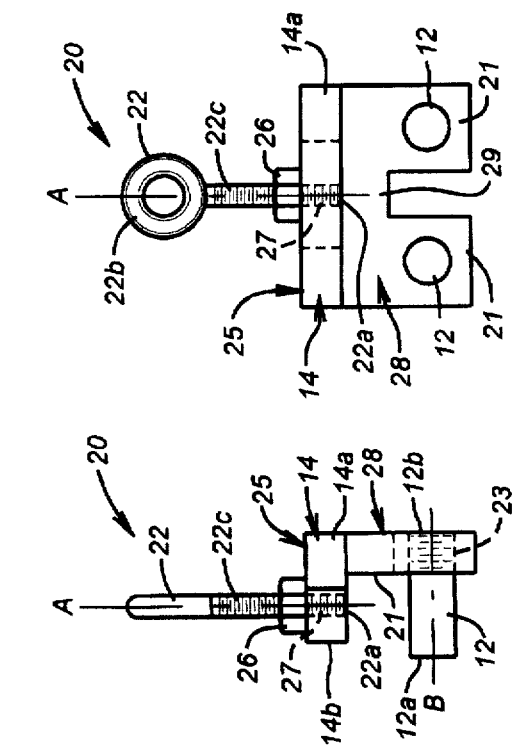
FIG. 3
FIG. 2

HEAVY OBJECT LIFTING CONNECTOR DEVICE

BACKGROUND OF THE INVENTION

1. Field of the Invention

The present invention relates to connectors for use in lifting heavy objects. In particular, the present invention relates to connector apparatus or devices for lifting pipe flanges, manway/handhold covers, or valve bonnets containing bolt holes.

2. Description of the Prior Art

In many industrial facilities there are a number of horizontally and vertically oriented heavy objects such as pipe flanges, manway/handhold covers ("covers"), and valve bonnets. These objects are attached to other items by bolt passing through bolt holes. After installation, periodically, there is a need to remove or replace them, or to re-install them. So far as is known, the conventional way of doing this was to connect a cable or chain of a hoist or other lift mechanism directly to the object. Often, the hoisting cable or chain was rigged through an unoccupied bolt hole of the heavy object. Alternatively, many covers and valve bonnets, such as those that did not contain bolt holes, were drilled and tapped for eye bolts. After the eye bolt was installed, the cable or chain was rigged through it so that the heavy object could be lifted by a hoist or other lift mechanism.

Several disadvantages have existed with these prior connection methods for lifting heavy objects by hoisting cable or chain. For example, one disadvantage was that rigging the hoisting cable or chain through the bolt holes of pipe flanges or covers and lifting the heavy objects caused cracks to develop around the bolt holes. These cracks weakened the structure and shortened the useful life of the object.

Another disadvantage was that the drilling and tapping of manway/handhold covers and valve bonnets for eye bolts weakened the covers and valve bonnets. Drilling and tapping required removing valuable structural material, thus weakening the component strength and causing the development of cracks. Another disadvantage was that the attaching of a hoisting cable or chain to the heavy object was inconvenient, time consuming, and sometimes dangerous.

SUMMARY OF THE INVENTION

Briefly, the present invention provides an improved heavy object lifting connector device for lifting horizontally and vertically oriented heavy objects containing bolt holes. The connector device is versatile because it can be used with pipe flanges, manway/handhold covers, or valve bonnets. Furthermore, the connector device can lift heavy objects without causing structural damage to the object. Moreover, the connector device conveniently and safely attaches to the heavy object.

The heavy object lifting connector device according to the present invention includes a base assembly with an upper member attached to a lower member. The lower member includes a connector rod for inserting into a bolt hole on the heavy object. The upper member includes a translating lifting bolt that is transversely oriented to the connector rod of the lower member. A threaded lock nut is provided to perform a clamping function on the object. This holds the connector in place on the object to prevent movement or slippage of the object once the lifting bolt is located in the desired position.

In operation, the connector rod of the connector device is inserted into a bolt hole of a heavy object. Next, the lifting bolt is inserted through the upper member of the base assembly until it is secured tightly onto a peripheral or outer surface of the heavy object. A lock nut secures the lifting bolt to the upper member. To lift the heavy object, a cable or chain of a hoist or other lift mechanism can then be attached to the lifting bolt.

The present invention thus provides a lifting tool that lifts horizontally or vertically oriented heavy objects such as pipe flanges, manway/handhold covers, and valve bonnets without the need for drilling and tapping for eye bolts or rigging through existing bolt holes. Further, it allows a heavy lifting tool to be conveniently and safely attached to the heavy object.

BRIEF DESCRIPTION OF THE DRAWINGS

A better understanding of the present invention may be had by reference to the following drawings and contained numerals therein of which:

FIG. 1 is an isometric view of the heavy object lifting connector device of the present invention;

FIG. 2 is a side elevation view of the device of FIG. 1;

FIG. 3 is a front elevation view of the connector device of FIGS. 1 and 2;

FIG. 4 is an isometric view of an alternative embodiment of the present invention;

FIG. 5 is a side elevation view of the device of FIG. 4; and

FIG. 6 is an front elevation view of the device of FIGS. 4 and 5.

DETAILED DESCRIPTION OF PREFERRED EMBODIMENT

A heavy object lifting connector device 20 according to the present invention is shown in FIG. 1, as aligned for installation through bolt holes 10 of a heavy object H. As discussed above, the heavy object H may be of several types. The object H may take the form of a valve bonnet 18 (FIG. 1), a pipe flange 40 (FIG. 4), or a manway/handhold cover from a large bore pipe or tank (not shown). In any of these various forms, the heavy object H, whether the valve bonnet 18 or the pipe flange 40, typically includes a number of circumferentially disposed bolt holes 10 formed inwardly from a peripheral or outer surface 16.

As shown in FIGS. 1-3, the lifting connector device 20 includes a base assembly or frame 25 which has an upper plate or body member 14 attached to a lower leg member 28. The upper plate 14 is adapted to receive a lifting bolt 22 provided for connection with a hoist or other suitable lifting mechanism. The lower leg member 28 is adapted to receive one or more connector rods 12 which are provided to fit into bolt holes 10 of the heavy object H.

The upper plate member 14 includes a rear shoulder portion 14a, which attaches to the lower leg member 28, and a horizontally extending nose portion 14b, which extends parallel to the connector rods 12 of the lower member 28. The lower member 28 includes an upper yoke or span 29 extending transversely beneath the rear shoulder portion 14a of upper plate member 14. A set of downwardly extending legs 21 are formed on the lower member 28 beneath the yoke member 29. For desired lifting capacity, the assembly 25 is preferably made of steel of a suitable strength.

Each of the legs 21 of lower member 28 has an inwardly extending threaded connector socket or receptacle 23 formed therein. In the base assembly 25 (FIGS. 2 and 3), two connector rods 12, each with a first end 12a and a second end 12b, are connected, each to one of the legs 21 of the lower member 28. The rods 12 are generally cylindrical and of a size corresponding to the bolt holes 10. In the preferred embodiment, each of second ends 12b of connector rods 12 is threaded. The connector rods 12 thus engage with and are received in one of the corresponding connector sockets 23 on legs 21 of the lower member 28. Alternatively, the second ends 12b of connector rods 12 can be press fitted into corresponding holes of the legs 21. As a further alternative, the second ends 12b of connector rods 12 can be welded to the legs 21 or connector rods 12 can be molded into the lower member 28. The connector rods 12 are also preferably made of a suitable strength steel.

The upper member 14 extends outwardly at rear shoulder portion 14a perpendicularly from the lower member 28. Preferably, the rear shoulder 14a is welded to the lower member 28. Alternatively, the rear shoulder 14a and lower member 28 may be bolted together or the base assembly 25 may be forged or cast or otherwise integrally formed or molded into one piece. Additionally, the upper member 14 includes a nose portion 14b that extends in a plane parallel to a longitudinal axis of the connector rods 12. The nose portion 14b includes an inwardly threaded socket or hole 27 formed therein.

The lifting bolt 22, with a lower end 22a and an upper end 22b, is adapted to be inserted through the hole 27 of the nose portion 14b. When so inserted, lifting bolt 22 is rotatably movable with respect to the upper member 14.

Thus, the lower end 22a of bolt 22 may be moved downwardly through upper member 14 into contact with the outer surface 16 of the object 20. The location of the connector rods 12 and upper member 14 define a slot into which the object 10 is forced. As will be set forth, the bolt 22 can then be locked against relative movement, holding the object 10 in place in the connector 20. Because the nose portion 14b is parallel to the connector rods 12 of the lower member, a longitudinal axis A of the lifting bolt 22 is transversely oriented to the connector rods 12. Preferably, for stability during lifting of object H, the longitudinal axes B of connector rods 12 are spaced equidistant from a vertical plane defined by the longitudinal axis A of lifting bolt 22 passing through upper member 14. This geometric configuration is stable because both connector rods 12 carry an equal portion of the weight of object H thus eliminating twisting during lifting.

A shaft portion 22c of the lifting bolt 22 extending above the lower end 22a is threaded to engage and be received in the corresponding threaded socket 27 of the nose portion 14b of the upper member 14. For ease of attachment to a hook or cable of a lift mechanism, the upper end 22b of the lifting bolt 22 is typically formed into a loop or an eyelet shape. A correspondingly threaded lock nut 25 is threaded onto shaft 22c of bolt 22 between the upper end 22b and the nose portion 14b of the upper member 14. The lock nut 25 is rotatbly movable downwardly on the bolt 22 into a locking position firmly engaging the upper member 14. In this position, the bolt 22 is locked in place against relative movement with respect to the upper member 14. The object H is then locked into the connector 20.

In operation, each of the connector rods 12 of the legs 21 is inserted into a corresponding one of a pair of bolt holes 10 of heavy object H. Next, the lifting bolt 22 is threaded through the threaded socket 27 of upper member 14 until the contact end 22a firmly contacts the peripheral or outer surface 16 of the heavy object H. The outer surface 16 of object H is thus firmly fitted and engaged between the connector rods 12 and the plate member 14. The lock nut 25 is then threaded down the shaft 22c until the lock nut 25 tightly abuts the upper member 14. The lock nut 25 thus holds the contact end 22a in place and prevents movement of the object H with respect to the connector 20. To lift the heavy object H, a hook, cable or chain of a suitable lift mechanism is then attached to the hoist end 22b of the lifting bolt 22.

An alternative heavy object lifting connector device 30 is shown in FIGS. 4–6, with a single connector rod 12 as aligned for installation through a single bolt hole 10 of a heavy object H. As shown in FIGS. 4–6, the lifting connector device 30 includes a base assembly 35 which has an upper plate or body member 14 attached to a lower leg member 32. The upper plate member 14 is of the same configuration as the upper member found on connector device 20 and thus bears a like reference numeral. As discussed above, the upper member 14 includes a rear shoulder portion 14a for attachment to the lower leg member 32 and a horizontally extending nose portion 14b, which extends parallel to the connector rod 12 of the lower member 32. The lower member 32 includes an upper yoke or span 39 extending transversely beneath the upper plate member 14 at a rear shoulder portion 14a and one downwardly extending leg 36. For desired lifting capacity, the assembly 32 is preferably made of steel of a suitable strength.

The leg 36 has an inwardly extending threaded passage or connector receptacle 38 formed therein. Referring to FIGS. 5 and 6, the connector rod 12, with a free end 12a and a fixed end 12b, is connected to the leg 36 of the lower member 32. In the preferred embodiment, the fixed end 12b of connector rod 12 is threaded to be received into the corresponding threaded receptacle 38 formed on leg 36. If desired, a bushing 33 can be mounted in the corresponding threaded receptacle 38. The bushing 33 has an inwardly extending threaded passage 37 formed therein. The bushing 33 may be one of several, each with a different diameter threaded passage 37. The bushing 33 allows the use of smaller sized diameters of connector rod 12, the diameter selected dependent upon the size of bolt hole 10 of the heavy object H. Alternatively, the fixed end 12b of connector rod 12 can be press fitted into receptacle 38 or bushing passage 37 of the legs 36. If there is no need for the bushing 33, the fixed end 12b of connector rod 12 can be welded to the leg 36 or connector rod 12 can be molded into the lower member 32.

In similar fashion to connector device 20, the upper member 14 of connector 30 extends outwardly at rear shoulder portion 14a and perpendicularly from the lower member 32. As was the case with connector 20, the rear shoulder 14a may be welded or bolted to member 32, or the base assembly 35 may be forged or cast or otherwise integrally formed in one piece. The upper member 14 of connector 30 also includes a nose portion 14b extending parallel to the connector rod 12 and an inwardly threaded socket or hole 27. A lifting bolt 22 like that used in connector 20, with a contact end 22a and a hoist end 22b, is inserted through the hole 27 of the nose portion 14b. Because the nose portion 14b is parallel to the connector rods 12 of the lower member, the lifting bolt 22 is transversely oriented to the connector rods 12.

The lifting bolt 22 of the connector 30 is of the same construction and functions in the same way as in the connector device 20. Accordingly, structural components performing the same function bear like reference numerals in the lifting bolt 22 and lock nut 25 of connector devices 20 and 30.

In operation, the connector rod 12 of the leg 36 is inserted into a suitably located bolt hole 10 of heavy object H. Next, the lifting bolt 22 is rotated in the threaded socket 27 of upper member 14 until the contact end 22a securely contacts the peripheral or outer surface 16 of the heavy object H. The lock nut 25 is then threaded down the shaft 22c until the lock nut 25 abuts the upper member 14, and a cable or chain of a hoist or other lift mechanism is attached to the hoist end 22b of the lifting bolt 22.

The foregoing disclosure and description of the invention is illustrative and explanatory thereof, and various changes in the size, shape, and materials as well as in the details of illustrative construction and assembly, may be made without departing from the spirit of the invention.

What is claimed is:

1. A connector device for attachment to an object in connector holes formed near a surface of the object for lifting the object comprising:

a connector rod having a first end for insertion into one of the object connector holes; said connector rod having an axis;

a lifting bolt with a lower end adapted to engage the object surface and an upper end for attachment to a lifting mechanism for lifting the object; said lifting bolt having an axis;

said lower end of said lifting bolt being movable into contact with the object surface to exert a clamping force, in conjunction with said connector rod, on the object;

a base assembly having a lower member with a socket therein for receipt of said connector rod and an upper member extending transversely to said lower member and having a socket therein for receiving said lifting bolt wherein the lifting bolt axis and the axis of the connector rod extend transverse to one another; and a lock mechanism mounted on said lifting bolt, said lock mechanism being movable to a locked position preventing movement of said lifting bolt relative to said upper member.

2. The connector device according to claim 1, wherein said lifting bolt extends upwardly along its said axis in a vertical plane from said upper member and said connector rod extends outwardly along its said axis.

3. The connector device according to claim 1, further including:

a bushing insertable into said connector socket of said lower member to form a reduced size connector socket for receipt of smaller diameter connector rods.

4. The connector device according to claim 1, wherein said upper member socket has a threaded surface in it, and said lower end of said lifting bolt is threaded along a portion for insertion into said upper member socket.

5. The connector device according to claim 1, wherein said locking mechanism includes a lock nut mounted on said lifting bolt and engageable with said upper member.

6. The connector device according to claim 1, wherein:

said lifting bolt extends upwardly along its said axis from said upper member; and said lower member includes at least two sockets spaced equidistant from said lifting bolt axis; and further including:

said connector rod mounted in each of said lower member sockets.

7. A connector device for attachment to an object in connector holes formed in the object and for coupling with a lifting mechanism for lifting the object, comprising:

a base assembly, having:

a lower member with a connector socket therein; and
        an upper member with a connector socket therein;

a connector rod for insertion at a first end into connector holes in the object, said connector rod having a second end fitted into said lower member connector socket; said connector rod having an axis; and a lifting bolt having an attachment formed at an upper end for engagement by the lifting mechanism, said lifting bolt having a lower end movable with respect to said connector socket in said upper member into contact with the object to exert a clamping force, in connection with said connector rod, on the object; said lifting bolt having an axis wherein the lifting bolt axis and the axis of the connector rod extend transverse to one another.

8. The connector device according to claim 7, further including:

a lock nut mounted on said lifting bolt, said lock nut being movable to a locked position preventing said lifting bolt from movement relative to said upper member.

9. The connector device according to claim 7, said lower member has plural sockets therein for receiving said connector rod, and further including:

at least a second said connector rod adapted to fit into a separate one of said plural sockets.

10. The connector device according to claim 9, wherein said lifting bolt extends upwardly along its said axis in a vertical plane from said upper member and said connector rods extend outwardly along their said axes spaced equidistant from said vertical plane.

11. The connector device according to claim 7, wherein said lower end of said lifting bolt is movable to engage the object outer surface and in conjunction with said connector rod exerts a clamping force on the object.

12. The connector device according to claim 7, further including:

a bushing insertable into said connector socket of said lower member to form a reduced size connector socket for receipt of smaller diameter connector rods.

* * * * *